B. H. SKELLY.
OILING DEVICE.
APPLICATION FILED SEPT. 24, 1920.
1,415,124.
Patented May 9, 1922.
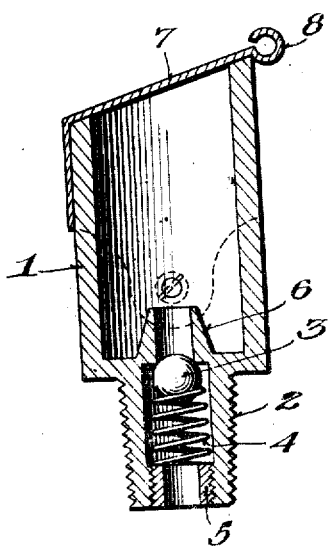
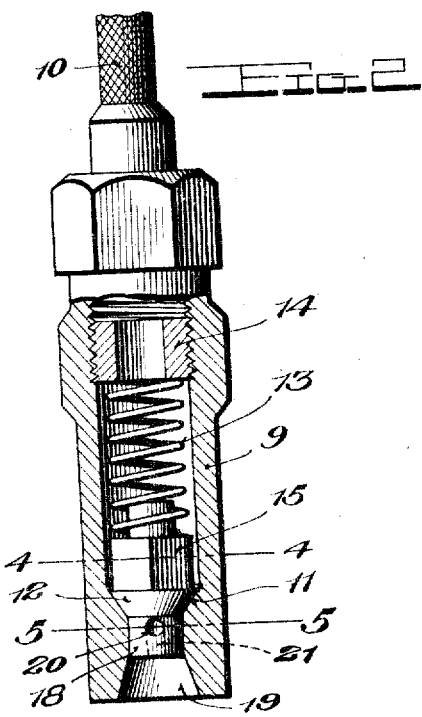
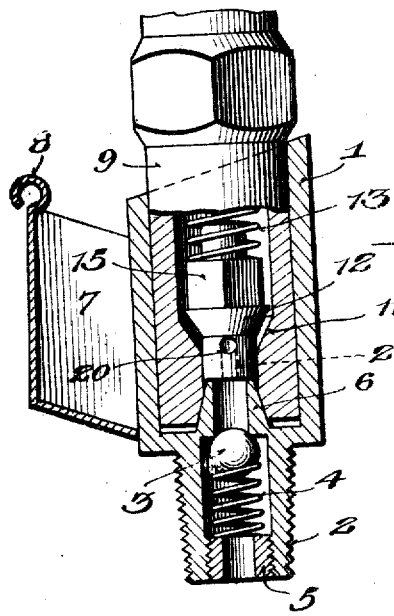
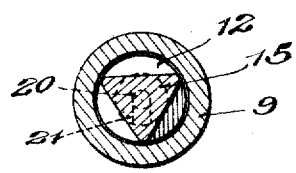
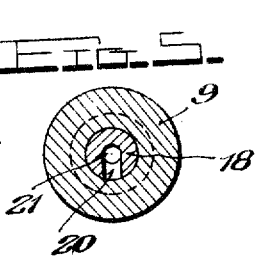
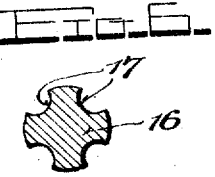
Inventor
Bernard H. Skelly
By
Attorney

UNITED STATES PATENT OFFICE.

BERNARD H. SKELLY, OF BRIDGEPORT, CONNECTICUT.

OILING DEVICE.

1,415,124.  Specification of Letters Patent.  Patented May 9, 1922.

Application filed September 24, 1920. Serial No. 412,488.

*To all whom it may concern:*

Be it known that I, BERNARD H. SKELLY, a citizen of the United States, residing at the city of Bridgeport, in the county of Fairfield and State of Connecticut, have invented certain new and useful Improvements in Oiling Devices; and I do declare the following to be a full, clear, and exact description of the invention, such as will enable others skilled in the art to which it appertains to make and use the same.

This invention relates to certain new and useful improvements in a device for oiling chassis bearings of automobiles, and it consists in a novel form of oil cup and a cooperative delivery nozzle connected to a lubricant supply, as by a flexible conduit, and embodying an automatic shut-off valve which, when the nozzle is urged downwardly onto the cup, will open and permit the passage of lubricant from the nozzle to the cup.

Primarily, the invention resides in improved means for the expeditious oiling of bearings on an automobile chassis other than those that relate to the motor itself.

The invention further resides in an improved oil cup or nipple designed to replace and be substituted for ordinary oil and grease cups, and embodying a seat on which a supply nozzle is engaged to effect the opening of a valve within the nozzle and also to provide a tight joint and seat between the cup and nozzle.

Further, the invention is found to reside in an improved supply nozzle having an inwardly opening valve for arresting the flow of lubricant except when the same is unseated as by engagement with an oil nipple or cup.

Other objects will appear as the description progresses, and those features of construction, and arrangements and combinations of parts on which protection is desired will be hereinafter described and claimed, reference being had to the accompanying drawings wherein:

Figure 1 is a vertical section through the improved oil cup or nipple;

Figure 2 is a similar view of the discharge nozzle, with its contained valve operative;

Figure 3 depicts the foregoing parts operatively related or associated for delivering oil to a bearing;

Figures 4 and 5 are detailed sectional views on lines 4—4 and 5—5, respectively, of Figure 2; and Figure 6 is a like view about on the plane of line 4—4 through a modified form.

The nipple or oil cup 1 is preferably polygonal in cross section to receive an ordinary spanner wrench whereby its plug or lower threaded end 2 may be more easily connected to a bearing. This threaded plug is counterbored to provide a seat for the ball check valve 3 which is backed by a spring 4, the latter being confined within the counterbore by the ring nut 5. The interior of the cup is hollow and provides a comparatively long bearing surface for the nozzle part hereinafter described. Integrally formed in the bottom of the cup is a beveled or conical seat 6 through which extends the inlet duct which is normally closed by the check valve 3 to prevent back flow of oil. The upper, opened end of the cup is shaped on a bias and adapted to be closed by a cap 7 which is pivoted to the sides of the cup for swinging rearwardly from off the latter. The cap substantially conforms to the cup, being open at the front and provided with a downwardly and outwardly rolled lip 8 on the front edge of the top to snap or spring over the forward edge of the cup.

The nozzle 9, which has a flexible tube connection 10 to a suitable receptacle or tank wherein the oil is contained under pressure, is designed to slidably and snugly fit the long chamber of the oil cup or nipple. The nozzle is tubular throughout so as to always be in direct communication with the hose connection 10, and adjacent its outer end said nozzle is formed with a tapered valve seat 11 for engagement by the conical valve 12. Said valve is spring-seated by a coiled spring 13 compressed between a ring nut 14, threaded in the inner end of the nozzle, and the upper guide extension 15 of the valve which is shown formed with a short stud to enter the lower end of the spring. In this connection it may be stated that while this body or guide portion 15 is preferably triangular in cross section, it is obvious that any suitable cross section may be had which permits of the ready flow of oil thereby, such as is depicted at Figure 6 wherein a cylinder guide 16 is formed with oil grooves 17 lengthwise thereof. The valve is also equipped with a lower guide extension 18 which fits a reduced axial bore in the nozzle and extends to the upper or inner end of the flared seat 19 which opens through the outer end of the nozzle for engaging on the cup seat 6, being slightly shorter than the latter as depicted in Figure 3. Immediately beneath the valve, the extension 18 is formed with a lateral port 20 leading to an axial duct 21 adapted to establish communication with the outlet passage of the oil cup.

In practical use, the nozzle is inserted within the cup and the flared seat 19 engaged with seat 6, when, upon continued pressure exerted by the hand when pushing in the nozzle, the barrel extension 18, which may be considered as a valve, will be forced backwardly by said seat 6, thus causing the conical valve or part 12 to leave its seat 11, whereupon the oil will immediately under its pressure be forced around the sides of the guide 15 and valve 12, into the port 20, out through the port 21 and into the cup inlet, and the pressure back of the oil will force down the ball check valve and discharge the oil into the bearing to be lubricated. As soon as the operator ceases pressing the nozzle inwardly the beveled part 12 will immediately seat against 11, thus cutting off the supply of oil, and the ball check 3 will automatically seat itself thus preventing the oil from being forced back through the opening into the cup. The cap 7 is then closed to keep out all dirt and grit from the cup.

This same operation is repeated for each bearing or oil cup. The nipple or cup 1 is substituted for ordinary lubricant cups and by the employment of the cooperating nozzle the various bearings on an automobile chassis can be most expeditiously lubricated. Obviously, the cups can be attached to various other bearings wit'out departing from the spirit of the invention.

No claim is made herein to the combination of a suitable receptacle or tank wherein the material is constantly maintained under pressure and automatically released therefrom when the nozzle is brought into proper juxtaposition with the elements to be lubricated. Such matter is set forth and claimed in my copending application Serial No. 423,086, filed November 10, 1920.

What is claimed is:

1. In a device for oiling the bearings of an automobile chassis, a cup having throughout its upper portion a fixed elongated opening while its lower part terminates in an exteriorly threaded plug also having an opening therethrough which communicates with the first named opening, an exteriorly beveled seat upstanding from the bottom of the cup and having an inlet port therethrough whereby communication is established between said openings, a supply nozzle for discharging oil under pressure and adapted to be inserted in the cup, and a check valve in the nozzle arranged to be unseated by pressure of the nozzle against said seat, whereby the oil may be discharged into the bearings to be lubricated.

2. In a device for oiling the bearings of an automobile chassis, a cup having throughout its upper portion a comparatively large elongated opening while its lower portion terminates in an exteriorly threaded plug having a comparatively smaller opening therethrough which communicates with the first named opening, an exteriorly beveled seat upstanding from the bottom of the cup and having an inlet port therethrough whereby communication is established between said openings, a supply nozzle for discharging oil under pressure and which is adapted to be inserted in the cup and which has a flared seat that engages over said beveled seat, and a check valve in the nozzle which is unseated by pressure of the nozzle against said beveled seat.

3. In a device for oiling the bearings of an automobile chassis, a cup open at its top and having a fixed beveled seat upstanding from the bottom and provided with an inlet, an oil pressure supply nozzle adapted to be inserted in the cup and having a flared seat for engaging over the cup seat, a valve seat provided in the nozzle inwardly from the flared seat, a valve engaging said valve seat, a reduced bore connecting the two nozzle seats, and a valve engageable on the valve seat and having an extension fitting the bore, said extension formed with a duct opening through its outer end and laterally adjacent the valve, and engageable against the cup seat to unseat the valve and thereby establish communication with the parts to be lubricated.

4. In a device for oiling the bearings of an automobile chassis, a cup open at its top and having a beveled seat upstanding from the bottom and provided with an inlet, an oil pressure supply nozzle adapted to be inserted in the cup and having a flared seat for engaging over the cup seat, a valve seat provided in the nozzle inwardly from the flared seat, a valve engaged on the valve seat and having an inner guide extension for guiding the valve and permitting the oil to flow thereby, a ring nut threaded in the inner end of the nozzle, and a coiled spring confined between the nut and valve.

5. An oiling appliance for an automobile chassis, comprising a cup member open throughout its length and adapted to be secured to the part to be oiled, an exteriorly beveled nipple upstanding from the bottom of the upper portion of said member and having an inlet whereby the upper and lower parts of said member are in communication, a spring actuated check valve for normally closing the lower end of said inlet, a nozzle connected with an oil supply under pressure, and a check valve within said nozzle for normally closing the latter and having an extension which contacts said nipple when the nozzle is inserted within the cup, whereby the pressure of the nozzle against the nipple will open the valve in the nozzle and effect the discharge of oil to the parts to be lubricated.

In testimony whereof I affix my signature.

BERNARD H. SKELLY.